July 7, 1970  J. W. KASMAN ET AL  3,519,308
SEAT CONVERSION KIT

Filed May 14, 1968  2 Sheets-Sheet 1

INVENTORS
JOHN W. KASMAN
EDWIN H. GOEHRING
BY
ATTORNEY

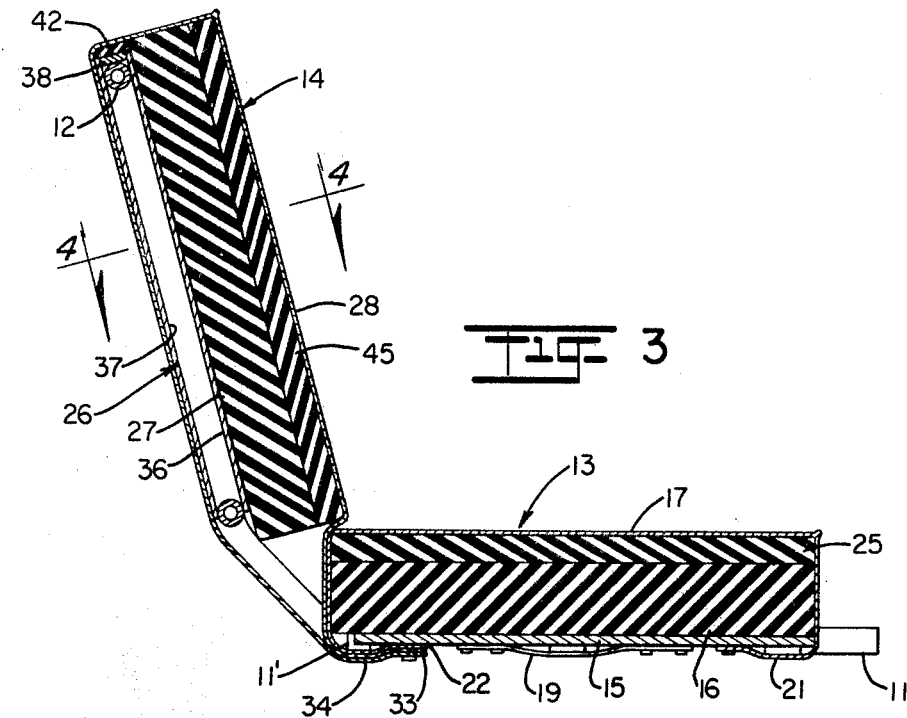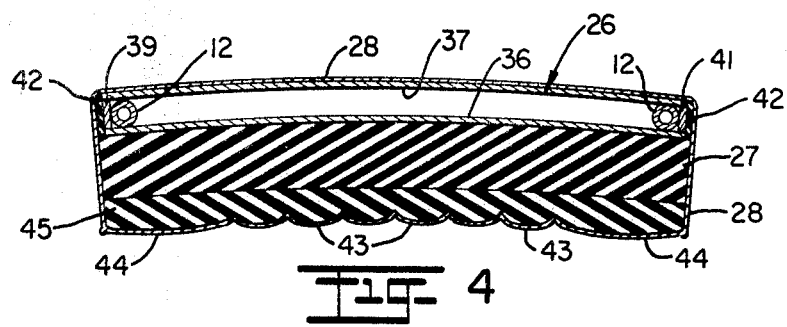

United States Patent Office 3,519,308
Patented July 7, 1970

3,519,308
SEAT CONVERSION KIT
John W. Kasman, 1140 El Paso Blvd., and Edwin H. Goehring, 21 Greenwood Blvd., both of Denver, Colo. 80221
Filed May 14, 1968, Ser. No. 729,125
Int. Cl. A47c 5/06, 7/02
U.S. Cl. 297—452                                    8 Claims

ABSTRACT OF THE DISCLOSURE

Seat cushions furnished as a kit of separate preformed matching backrest and seat cushion assemblies are especially adaptable for replacing existing cushions on a seat frame preferably for Jeep-type vehicles. The backrest cushion assembly includes a unique backing member having a cushion layer on a forward surface and a styled covering member enclosing the backing member and cushion member therewith to form a unitary assembly. The backing member is shaped in the form of a sheath for sliding over an upright portion of the seat frame and is rounded along the corners and across the front surface to provide a bucket seat style.

---

This invention relates to novel and improved preformed seat cushion assemblies and is particularly suitable for installation on Jeep-type vehicle seats for replacement of existing cushions.

Vehicle seat cushions such as those found in the Jeep-type vehicles become worn after extended periods of useage and replacement is desirable. Customarily, Jeep models and other motor vehicles of this type are provided with cushions, which are lacking in both comfort and a modern style or appearance. Accordingly it is an object of the present invention to provide a simple and durable preformed seat cushion including separate backrest and bottom seat cushion assemblies which are easily installed on existing vehicle seat frames.

Another object of this invention is to provide a seat cushion assembly which permits replacement of existing backrest and seat cushions with a bucket seat style on either the front or rear seats.

A further object of this invention to to provide a preformed seat cushion assembly which affords a wide selection of colors, designs and customized styles for Jeep-style vehicle seats.

In accordance with the present invention there is provided preformed matching backrest and seat cushion assemblies arranged for installation on a seat frame with the backrest cushion assembly including a backing member of a sheathlike construction shaped to slide over and fit snugly against the upright portion of the frame, the backing member having rounded corners and generally concave forward surface. The backrest assembly is completed by a cushion layer and a styled cover member enclosing the backing member and cushion layer to form a unitary assembly. Flap extensions on the cover member serve to draw the backrest and seat cushion members into a snug-fitting relation on the seat frame.

Other objects, advantages and capabilities of the present invention will become apparent as the description proceeds taken in conjunction with the accompanying drawings, in which:

FIG. 3 is a sectional view of the seat of FIG. 1 taken along lines 3—3 of FIG. 1; and FIG. 4 is a section view taken along lines 4—4 of FIG. 3.

Figure 1:
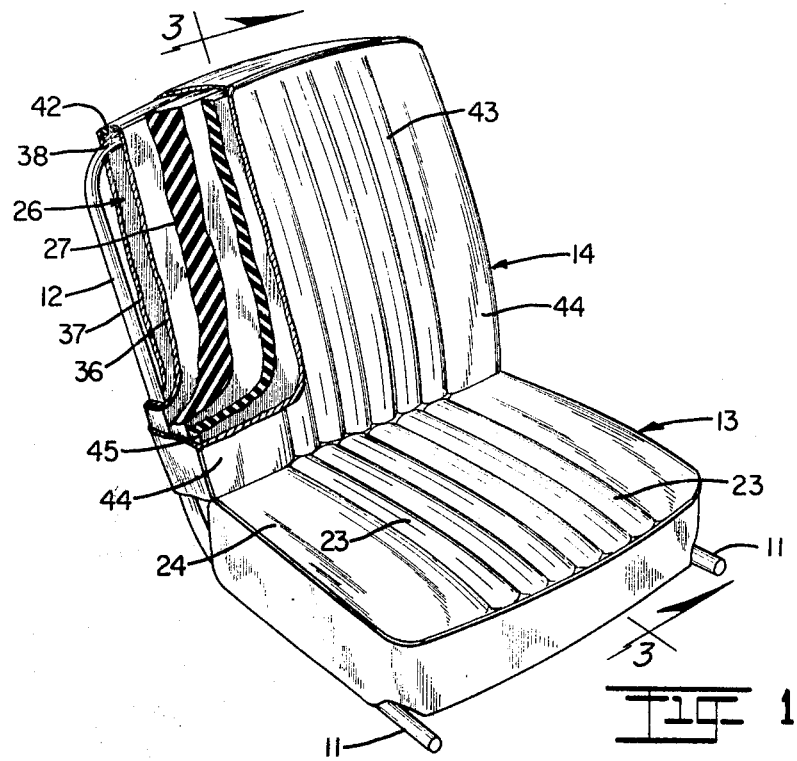
FIG. 1 is a perspective view showing the upper surface of a Jeep-type vehicle seat embodying features of the present invention with portions of the backrest cushion assembly broken away to show interior parts.

Referring now to the drawings the seat frame shown therein is typical of that found in a Jeep-type vehicle and comprises a horizontal bottom portion 11 which rests on the floor of a vehicle and is detachably secured thereto by bolts and an upright portion 12 which extends upwardly and inclines rearwardly from the bottom portion 11. A typical seat frame is formed of a continuous single piece metal rod which is shaped to extend along the sides and across the top of the seat and is suitably curved at the corners, with reinforcing cross members for added strength. A cross piece 11' formed of an angle iron is disposed at the rear of the bottom portion 11. Some forms of these seat frames are provided with legs which will elevate the seat above the vehicle floor.

In general the seat frame is covered by a seat or bottom cushion assembly generally designated by number 13 and the upright portion of the seat frame is covered by a backrest cushion assembly generally designated by numeral 14. Each of these cushion assemblies 13 and 14 are separately formed or prefabricated and are then mounted in the position shown in the drawings after existing cushions have been removed from the vehicle seat frame. The usual procedure is first to install the seat cushion assembly 13 and then the backrest cushion assembly 14. The seat cushion assembly 13 comprises a flat base 15 preferably of plyboard or the like having a rear portion which seats in cross piece 11', a thick layer of cushion material 16 such as foam rubber which is disposed on the base and preferably secured thereto as by an adhesive. The cover member 17 encloses and covers the base 15 and cushion material 16. The cover member has side flap extensions 18 and 19 which extend around the bottom portion of the seat frame and front and rear extensions 21 and 22 which are fastened to the undersurface of the base 15 as by nails, tacks or the like to draw the cushion assemblies tightly against the seat frame.

The covering member 17 may be of a variety of styles, shapes and materials but the form herein illustrated is of the bucket seat type preferably composed of a naugahyde material with a particular ribbed construction including a series of narrower ribs 23 centrally of the cushion and a wider rib 24 on each side which is more pronounced and of a greater depth than the narrower ribs 23. These ribs are formed in the cover member using another layer of cushion material 25 which is stitched to the inner side of the cover member 17 with a series of parallel lengths of stitches arranged along the top surface of the cover member and extending transversely of the width thereof.

Figure 2:
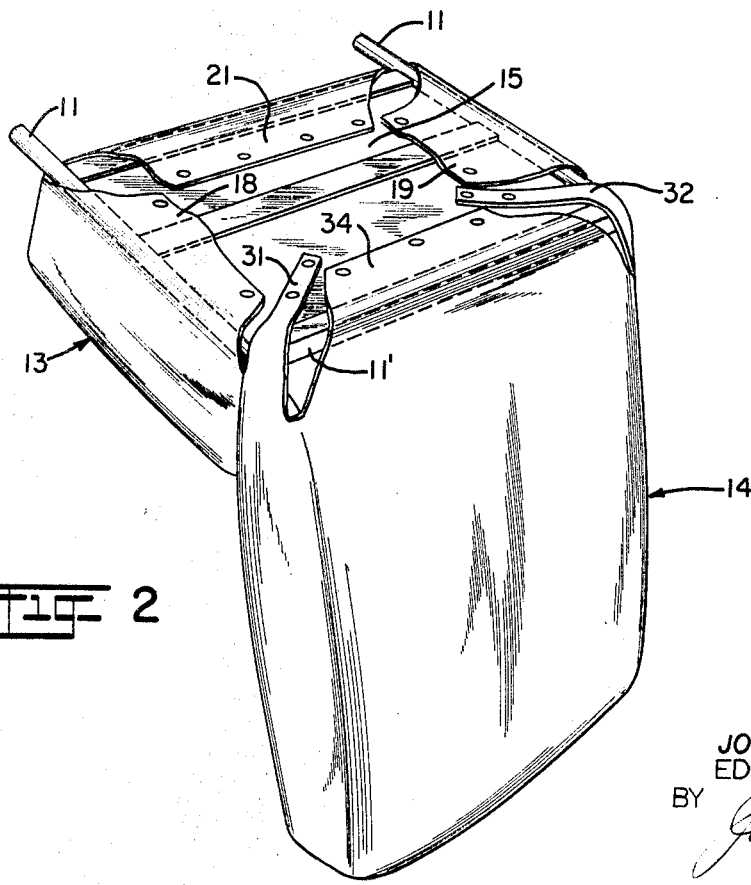
FIG. 2 is a perspective view showing the undersurface of the Jeep-type vehicle seat shown in FIG. 1.

The backrest cushion assembly 14 in general comprises a hollow backing member 26, a thick layer of cushion material 27 such as foam rubber on the front surface of the backing member and a covering member 28 enclosing or encompassing the backing member and cushion layer. The covering member 28 like that of the bottom seat cushion assembly has side flap extensions 31 and 32 and front and rear flap extensions 33 and 34 are joined together and extend to the undersurface of the seat cushion assembly 13 and are attached thereto as by nails, tacks or the like as is shown in FIGS. 2 and 3.

The backing member 26 is of a particular shape which may be characterized as sheathlike or of an envelope construction being closed on all sides except the bottom to form a pocket so it will slide over the full length of the upright backrest portion of the seat frame when it is installed thereon and establish a particular shaping and support for the back of the seat. The preferred construction shown includes front and rear panels 36 and 37 held in spaced relation by an arcuate shaped top block 38 and spaced side blocks 39 and 41. The side blocks define guide surface when the backing member is moved downwardly against the outer surfaces of the sides of the backrest frame portion 12. A padding member 42 extends around the top and sides of the spaced panels 36 and 37 to provide a rounded shape for the top and sides of the backrest cushion assembly. The corners of the backing member in a preferred shape are rounded to conform to the seat frame shaping and the backing member is rounded or curved laterally of its width (FIG. 4) to form a recessed area to accommodate the shape of the back of a person for a bucket seat type style.

As with the seat cushion assembly 13 the cover member 28 of the backrest cushion assembly 14 has a series of centrally disposed narrow ribs 43 and a wider rib 44 at each side which form an extension of the ribs of the seat cushion assembly. This shape is produced by an interior padding or cushion member 45 attached to or otherwise sewn on the inner surface of the covering material 28.

A typical installation procedure for the above-described seat kit apparatus is to first remove the seat frame from the vehicle and then the existing cushions or upholstery from the seat frame. The frame is then disposed in an upright position and the rear bottom edge of the cushion assembly 13 is set into position on cross piece 11'. Holding the seat cushion assembly 13 in place, the frame and seat cushion assembly are turned upside down with the seat cushion assembly 13 placed on a flat surface. The flap extensions 18, 19, 21 and 22 are successively pulled firmly over the seat frame and tacked or otherwise secured to the baseboard 15.

For the backrest cushion assembly 14 the backing member 26 is slid over the top of frame portion 12 and slide down until it stops. The seat is turned over and beginning with the side flaps 31 and 32, they are pulled downwardly and forwardly and are then secured to the baseboard 15. The front flap 33 is pulled down and drawn over the flap 22 of the other cushion and secured to the baseboard 15. Similarly, the rear flap 34 is pulled down and joins with front flap 32 and overlaps the same when secured to the baseboard 15.

From the foregoing it is apparent that the cushion assemblies may be installed with relative ease and without requiring any special equipment. The backrest cushion may be easily slipped over the upright portion of the seat frame with no problem of alignment. These cushions may be furnished in a variety of colors and sizes and may be easily stored and displayed until installed. They provide increased comfort from that of many standard equipment cushions because there is added cushioning and the comfort of a bucket seat style.

Although the present invention has been described with a certain degree of particularly, it is understood that the present disclosure has been made only by way of example and that changes in details of structure and system components may be made without departing from the spirit and scope thereof.

What is claimed is:

1. A preformed backrest cushion assembly for the upright portion of a vehicle seat frame comprising a sheathlike, essentially rigid backing member having a forward surface curved laterally of its width and open along the bottom for movement over an upright backrest portion of the seat frame to encompass the backrest portion, a layer of cushion material on said curved forward surface and an outer cover member enclosing said backing member and cushion.

2. A preformed backrest cushion assembly as set forth in claim 1 wherein said backing member is a unitary body having rounded upper corners and rounded portions along its exterior top and side surfaces.

3. A preformed backrest cushion assembly as set forth in claim 1 wherein said backing member is formed of a pair of front and rear essentially rigid panels held in spaced relation by an arcuate upper block forming the curve in the panels and spaced side blocks forming inner guide surfaces and including a curved padding member extending around the top and sides of the spaced panels.

4. A preformed backrest cushion assembly as set forth in claim 1 wherein said cover member includes extensions adjoining its lower end for extending under and attachment to the undersurface of an associated seat cushion bottom.

5. A bucket seat conversion kit for converting a vehicle saet frame into a bucket seat, the seat frame having a horizontal seat frame portion and a generally upright frame portion, said bucket seat conversion kit comprising a seat cushion mounted on the seat frame portion and a backrest cushion assembly mounted on the upright frame portion, said backrest cushion assembly including an essentially rigid backing member having front and back panels interconnected in spaced apart relation to define a pocket open along the bottom and being slidable over substantially the full length of the upright frame portion to encompass said upright frame portion, said front panel having a laterally concave forward surface, a layer of cushion material on said front panel, and an outer cover member enclosing said backing member and cushion layer.

6. A bucket seat conversion kit as set forth in claim 5 wherein said backing member includes essentially rigid, interior side surfaces defining guides for downwardly extending movement of the backing member onto the upright backrest frame portion.

7. A bucket seat conversion kit as set forth in claim 5 wherein said backrest cushion assembly includes forward and rear flap extensions extending downwardly from the outer lower member which are joined together beneath the seat frame to draw the backrest cushion assembly against the seat frame.

8. A bucket seat conversion kit as set forth in claim 5 wherein each said seat cushion and backrest cushion are contoured with a laterally concave shaping and the cover members associated with each cushion includes a series of ribbed portions extending transversely of the width thereof.

References Cited

UNITED STATES PATENTS

| 1,418,940 | 6/1922 | Kutschmar | 297—218 X |
| 3,086,817 | 4/1963 | Wilfert | 297—284 |
| 3,099,483 | 7/1963 | Hofberg | 297—219 |

FOREIGN PATENTS

| 1,307,103 | 9/1962 | France. |
| 1,511,646 | 2/1968 | France. |
| 896,090 | 5/1960 | Great Britain. |

CASMIR A. NUNBERG, Primary Examiner

U.S. Cl. X.R.

297—218, 460